US006716019B2

(12) United States Patent
Yamaguchi et al.

(10) Patent No.: US 6,716,019 B2
(45) Date of Patent: Apr. 6, 2004

(54) EXTRUSION MOLDING APPARATUS FOR CERAMIC MOLDED PRODUCT

(75) Inventors: Satoru Yamaguchi, Anjo (JP); Yasunao Miura, Nagoya (JP); Hiromi Katou, Kuwana (JP); Tadashi Tsuruta, Aichi-gun (JP)

(73) Assignee: Denso Corporation (JP)

( * ) Notice: Subject to any disclaimer, the term of this patent is extended or adjusted under 35 U.S.C. 154(b) by 74 days.

(21) Appl. No.: 09/849,364

(22) Filed: May 7, 2001

(65) Prior Publication Data

US 2002/0039604 A1 Apr. 4, 2002

(30) Foreign Application Priority Data

May 12, 2000 (JP) ....................................... 2000-140210
Mar. 30, 2001 (JP) ....................................... 2001-100666

(51) Int. Cl.[7] ................................................ B29C 47/10
(52) U.S. Cl. ...................... 425/198; 425/202; 425/208; 425/461
(58) Field of Search ................................ 425/197, 198, 425/199, 202, 208, 380, 382.3, 461

(56) References Cited

U.S. PATENT DOCUMENTS 2,488,129 A * 11/1949 La Lande, Jr. .......... 425/382 R
2,595,210 A * 4/1952 Clinefelter .................. 425/197
2,640,033 A * 5/1953 Marshall .................. 425/131.1
3,501,807 A * 3/1970 Selbach .................. 425/192 R
5,064,586 A 11/1991 Higashijima
5,567,463 A * 10/1996 Schaaf ....................... 426/523
5,589,203 A * 12/1996 Sato ........................... 425/147
5,738,884 A * 4/1998 Sato ........................... 425/197

FOREIGN PATENT DOCUMENTS

JP 2-251406 10/1990

* cited by examiner

*Primary Examiner*—Robert Davis
*Assistant Examiner*—Joseph S. Del Sole
(74) *Attorney, Agent, or Firm*—Nixon & Vanderhye PC

(57) ABSTRACT

An extrusion molding apparatus for a ceramic molded product which is capable of passing a ceramic material smoothly through a filter unit is disclosed. The extrusion molding apparatus comprises a mold (11) for molding a ceramic molded product, a screw extruder (4) for supplying a ceramic material (80) to the mold (11), and a filter unit (3) for filtering the ceramic material (80) at the extrusion outlet (41) of the screw extruder (4). The screw extruder (4) has built therein a screw (40) for kneading while at the same time leading the ceramic material (80) forward, and further has, on the front part thereof, a spatula portion (5) adapted to move over the inlet surface (30) of the filter unit (3) and there is a predetermined distance D between the spatula portion and the inlet surface (30).

7 Claims, 6 Drawing Sheets

EXTRUSION MOLDING APPARATUS FOR CERAMIC MOLDED PRODUCT

BACKGROUND OF THE INVENTION

1. Field of the Invention

The present invention relates to an extrusion molding apparatus for molding a ceramic molded product such as a honeycomb ceramic structure.

2. Description of the Related Art

For the catalyst carrier in an exhaust gas purification system of an automotive vehicle, for example, a honeycomb structure 8 is used as a ceramic molded product including a multiplicity of cells 88 having partitioning walls 81 as shown in FIG. 7. This honeycomb structure 8 is normally produced by extrusion molding.

The conventional extrusion molding apparatus 9 comprises, for example, a mold 91 for molding the honeycomb structure 8, and a screw extruder 98 for kneading and extruding a ceramic material 80 continuously, as shown in FIG. 8.

As shown in FIG. 8, a filter unit 93 for filtering the ceramic material 80 is interposed between the screw extruder 98 and the mold 91. This filter unit 93 is for preventing foreign matter from mixing with the honeycomb structure 8, and intended to trap foreign matter of a predetermined size or more by a filter unit net 930. For this purpose, the filter unit 93 includes the filter net 930 having a multiplicity of pores and a support member 935 for supporting the filter net 930. A resistance tube 92 making up a material path is normally arranged between the filter unit 93 and the mold 91.

In extrusion molding the honeycomb structure 8, the ceramic material introduced into the screw extruder 98 is filtered by the filter unit 93 while being supplied to the mold 91.

In the conventional extrusion molding apparatus 9 as described above, however, the following problem can be encountered.

Specifically, the ceramic material passing through the screw extruder is sometimes partially aggregated into a lump. The aggregated ceramic material (material lump) is trapped on the inlet surface of the filter unit 93 and reduces the fluidity of the subsequently influent ceramic material.

More specifically, as shown in FIG. 9, after the material lump 89 is trapped in the filter net 930, the ceramic material 80 passes around the material lump 89, so that the fluidity of the material is reduced while, at the same time, the flow velocity distribution of the material after the filter net is adversely affected. For this reason, various measures have been studied to supply the lumps of the ceramic material to the mold after they are restored to the original particulate form. Nevertheless, a satisfactory measure has yet to be established.

In the case where a plurality of screw extruders are provided in a plurality of stages as shown in FIG. 8, the filter unit 94 may be arranged also at the extrusion exit of the screw extruder 99 in the upper stage. A similar problem is posed in such a case.

This problem is shared by the extrusion molding apparatus used for extrusion molding various shapes of ceramic molded products such as sheets, round bars and pipes as well as honeycomb structures.

SUMMARY OF THE INVENTION

The present invention has been developed in view of the problems of the prior art described above and the object thereof is to provide an extrusion molding apparatus for a ceramic molded product in which lumps of an aggregated ceramic material can be passed through the filter unit smoothly.

DESCRIPTION OF THE PREFERRED EMBODIMENTS

Figure 1:
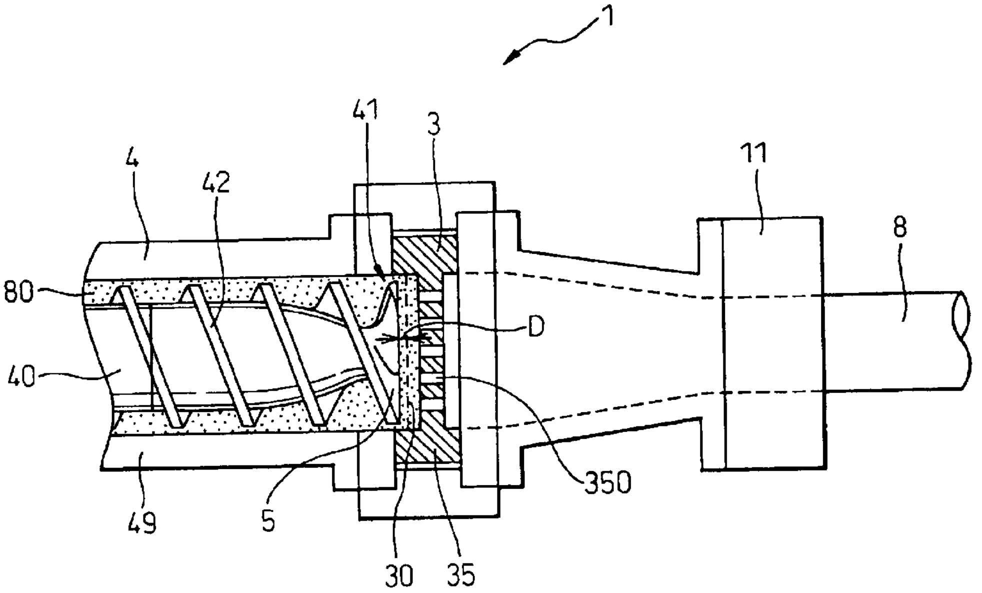
FIG. 1 is a diagram for explaining a configuration of an extrusion molding apparatus for a honeycomb structure according to a first embodiment of the invention.

According to a first aspect of the invention, there is provided an extrusion molding apparatus, for a ceramic molded product, comprising a mold for molding a ceramic molded product, a screw extruder for supplying a ceramic material to the mold, and a filter unit for filtering the ceramic material at the extrusion outlet of the screw extruder, wherein the screw extruder has built therein a screw for kneading while moving the ceramic material forward, and has on the front part thereof a spatula portion for moving over the inlet surface of the filter unit with a predetermined internal between the spatula portion and the inlet surface.

The most noticeable feature of the present invention is that the screw extruder includes the spatula portion described above. The spatula portion is moved over the inlet surface of the filter unit but out of contact therewith.

The inlet surface of the filter unit can be formed of a metal, ceramics or other materials in any of various shapes. Especially, it is preferably formed of a meshed sheet such as a metal net.

In the case where a plurality of screw extruders are arranged in a plurality of stages, any of various optimum configurations can be employed to assure an optimum operation in conformance with the characteristics of the ceramic material. For example, the spatula can be provided on all or one of the screw extruders.

Now, the functions and effects of the invention will be explained.

The apparatus according to this invention comprises the spatula portion which is moved while rubbing over the inlet surface of the filter unit as described above. As a result, lumps of the aggregated ceramic material, which may be trapped on the inlet surface of the filter unit, can be smoothly ground and passed through the filter unit.

Specifically, a lump of the ceramic material (hereinafter referred to as the material lump) trapped on the inlet surface of the filter unit comes into contact with the spatula portion approaching thereto and is pressed against the inlet surface. The material lump is thus subjected to a pressure higher than the pressure received from the normal ceramic material that flows in. As a result, the material lump is mashed into a small size in the same manner as if a food material is strained in cooking and passed through the filter unit to be changed into a state that can be molded.

For this reason, it is possible to solve the problems that the fluidity of the ceramic material is reduced and the flow velocity distribution of the ceramic material in and after the filter unit is adversely affected due to the presence of the material lump on the inlet surface of the filter unit.

As described above, in this aspect of this invention, there is provided an extrusion molding apparatus for a ceramic molded product that can smoothly pass lumps, of an aggregated ceramic material, through the filter unit.

According to a second aspect of the invention, there is provided an extrusion molding apparatus for a ceramic molded product, wherein the interval between the spatula portion and the inlet surface is preferably in the range of not more than 30 mm. In the case where the interval exceeds 30 mm, the problem is posed that a comparatively small material lump trapped on the inlet surface of the filter unit cannot be mashed sufficiently. The interval between the spatula and the inlet surface of the filter unit, therefore, is desirably such that the spatula portion approaches the inlet surface as near as possible while being kept out of contact therewith. The interval is more preferably not more than 10 mm. It is preferable that the interval be less than 0.1 mm for an artificial material or the like which is not liable to be mixed with foreign matter and very small in particle size. According to a third aspect of the invention, there is provided an extrusion molding apparatus for a ceramic molded product, wherein the interval between the spatula portion and the inlet surface may be in the range of 0.1 to 30 mm. In the case where a natural material liable to be mixed with foreign matter is involved, on the other hand, the interval less than 0.1 mm may cause the spatula portion to come into direct contact with the foreign matter trapped in the filter unit and damage the filter unit, and therefore the interval is preferably not less than 5 mm.

According to a fourth aspect of the invention, there is provided an extrusion molding apparatus, wherein the spatula portion is preferably so configured as to move while rotating over the inlet surface of the filter unit, in which case a spatula moving mechanism can be configured in a comparatively simplified fashion.

According to a fifth aspect of the invention, there is provided an extrusion molding apparatus, wherein the spatula portion is preferably extended from the forward end of the screw and is configured to rotate with the screw, whereby the spatula portion can be arranged in a movable fashion without a major reconstruction.

According to a sixth aspect of the invention, there is provided an extrusion molding apparatus, wherein the screw includes a lead portion arranged spirally around the axial member thereof, and the forward end of the lead portion preferably forms the spatula portion. As a result, the material lump can be smoothly led to the spatula portion along the lead portion and can be efficiently ground by the spatula.

The lead portion of the screw can be arranged in two or more turns as well as in a single turn of spiral. Especially by making the lead portion with two or more turns of spiral, the spatula portion can be arranged at two or more positions and therefore can be gyrated like a propeller. As a result, the material lump can be mashed more efficiently. Also, the lead portion can be a combination of a single turn and double turns of spiral or otherwise can be formed freely, depending on the characteristics required of the screw extruder.

According to a seventh aspect of the invention, there is provided an extrusion molding apparatus, wherein the spatula portion can be configured of a plurality of blades arranged on the forward axial portion extended from the forward end of the screw. Specifically, the blades can be provided regardless of the lead portion of the screw. In this case, the material lump can be mashed by the blades.

According to a eighth aspect of the invention, there is provided an extrusion molding apparatus, wherein the spatula portion preferably has a tapered surface inclined in such a manner as to come away from the inlet surface progressively with respect to the direction of movement. As a result, the material lump can be led to the forward end of the spatula along the tapered surface, thereby making it possible to mash the material lump more smoothly.

According to an ninth aspect of the invention, there is provided an extrusion molding apparatus, wherein the ceramic molded product has a honeycomb structure. The honeycomb structure has a complicated shape of the honeycomb with a comparatively high extrusion pressure. As a result, the fluidity in the extrusion molding apparatus has a considerable effect on the productivity of the extrusion molding operation of the honeycomb structure. Thus, the functions and effects of the present invention are exhibited very conspicuously in the extrusion molding apparatus for a honeycomb structure.

The functions and effects of the invention are conspicuously exhibited especially with a honeycomb structure having partitioning walls as thin as not more than 150 $\mu$m and a high extrusion pressure. In similar fashion, the effects of the configuration according to the present invention are exhibited conspicuously by the use of a thin sheet, a round bar of small diameter, a thin pipe or the like.

Embodiment 1

An extrusion molding apparatus for a honeycomb structure according to an embodiment of the present invention will be explained below with reference to FIGS. 1 to 4(*a*), 4(*b*) and 4(*c*).

Figure 7:
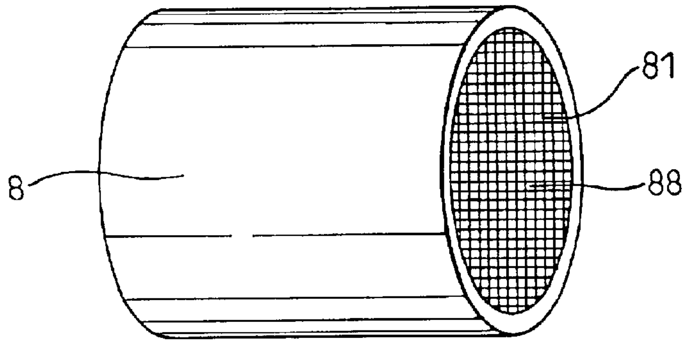
Fig.7 (PRIOR ART)
FIG. 7 is a diagram for explaining a honeycomb structure according to the prior art.

The honeycomb structure 8 produced in this embodiment is used as a catalyst carrier of an exhaust gas purification system of automotive vehicles, and as shown in FIG. 7, made of ceramic and has a multiplicity of cells 88 formed by partitioning walls 81.

An extrusion molding apparatus 1 for a honeycomb structure according to this embodiment comprises, as shown in FIG. 1, a mold 11 for molding the honeycomb structure, a screw extruder 4 for supplying a ceramic material 80 to the mold 11, and a filter unit 3 for filtering the ceramic material 80 at the extrusion outlet 41 of the screw extruder 4.

The screw extruder 4 has built therein a screw 40 for kneading while leading the ceramic material 80 forward, and also includes a spatula portion 5 formed on the front part thereof, which spatula portion is adapted to move in such a manner as to rub over the inlet surface 30 while maintaining a predetermined spaced relationship with the inlet surface.

This embodiment will be explained in detail below.

The filter unit 3, as shown in FIG. 1, includes a filter net 30 and a support member 35 for supporting the filter net 30. A protective metal net for protecting the filter net 30 may be interposed between the filter net 30 and the support member 35. The support member 35 has a multiplicity of through holes 350. The filter net 30 is made of a metal net having a mesh of 200. The filter net 30 makes up the inlet surface of the filter unit 3.

Figure 2A:
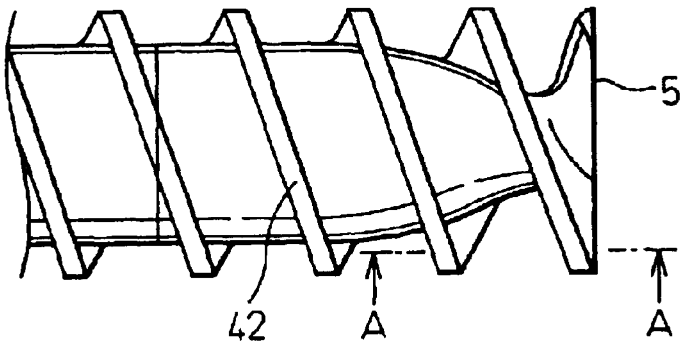
FIG. 2(*a*) is a side view and FIG. 2(*b*) a front view of a spatula portion according to the first embodiment.
Figure 2B:
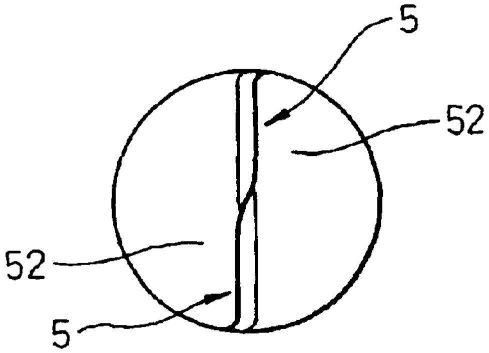
Figure 3:
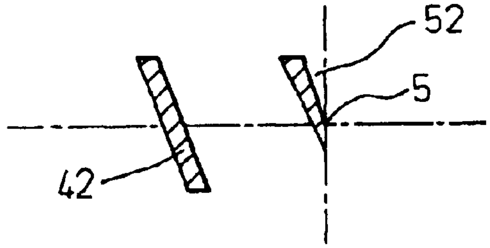
FIG. 3 is a sectional view taken in line A—A in FIG. 2.

The screw extruder 4, as shown in FIG. 1, has a screw 40 built in a cylindrical outer wall portion 49. As compared with the prior art, the screw 40 has the forward end thereof extended and includes a spatula portion 5 formed at the forward end of a lead portion 42. The lead portion 42 thus extended is arranged in a double spiral and, as shown in FIGS. 2(*a*), 2(*b*) and 3, is formed with the spatula portion 5 extended from side to side in the center of rotation at the foremost tip thereof.

The spatula portion 5 is configured to rotate with the screw 40. Also, the spatula portion 5 has a tapered surface 52 along the lead portion 42. The tapered surface 52 is inclined progressively away from the inlet surface 30 with respect to the direction of movement (rotation) of the spatula portion.

Also, according to this embodiment, the predetermined distance D (FIG. 1) between the spatula portion 5 of the screw extruder 4 and the filter net 30 making up the inlet surface of the filter unit 3 is set to 5 mm.

Now, the functions and effects of this embodiment will be explained.

In extrusion molding the honeycomb structure 8 in the extrusion molding apparatus 1, the ceramic material 80 is introduced into the screw extruder 4 from upstream of the screw extruder 4 and is led forward by the screw 40. In the meantime, the ceramic material 80 may be aggregated into a material lump. Even in such a case, according to this embodiment, the problems which otherwise might be caused by the material lump can be readily obviated by the spatula portion 5.

Specifically, the spatula portion 5 rotates while moving in such a manner as to rub over the inlet surface 30 providing the filter net of the filter unit 3 in spaced relationship therewith as described above. The material lump, even if trapped on the inlet surface 35 of the filter unit 3, therefore, can be passed smoothly through the filter unit 3.

Figure 4A:
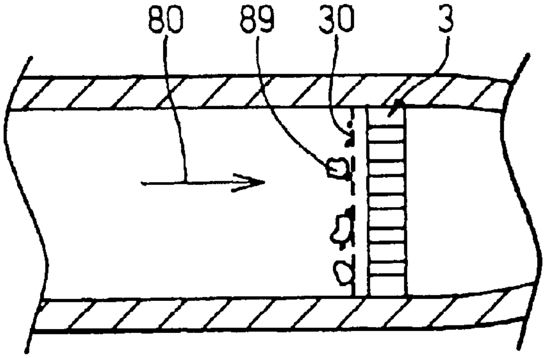
FIGS. 4(*a*), 4(*b*) and 4(*c*) are diagrams for explaining the functions and effects of the spatula portion according to the first embodiment.
Figure 4B:
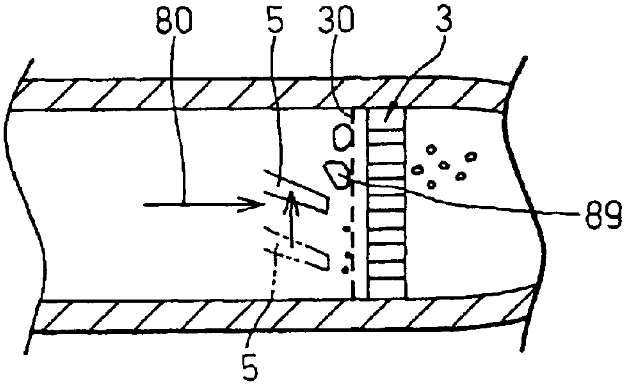
Figure 4C:
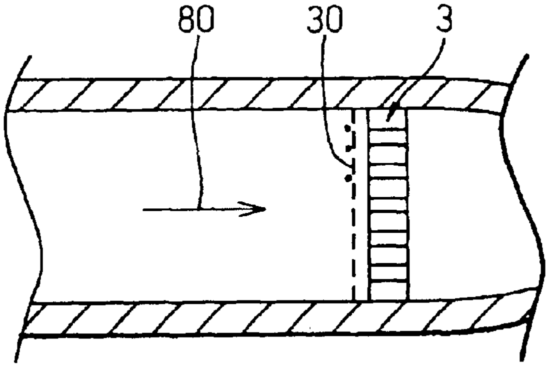

More specifically, as shown in FIG. 4(*a*), the material lump 89 that has been trapped on the inlet surface 30 of the filter unit 3, as shown in FIG. 4(*b*), comes into contact with the spatula portion 5 moving toward it and is pressed against the inlet surface 30. Then, as shown in FIG. 4(*c*), a pressure higher than the pressure received from the in flowing normal ceramic material 80 is applied to the material lump 89. As a result, the material lump 89 is ground to a small size on the inlet surface 30 in the same manner as if strained in cooking by means of a filter or sieve for converting into a soft mixture, while at the same time passing through the filter unit 3, and comes to assume a state ready for molding.

For this reason, the problems can be solved that the fluidity of the ceramic material 80 is deteriorated due to the presence of the material lump 89 on the inlet surface of the filter unit 3 or the flow velocity distribution of the ceramic material is adversely affected in the process at and after the filter unit 3.

Figure 8:
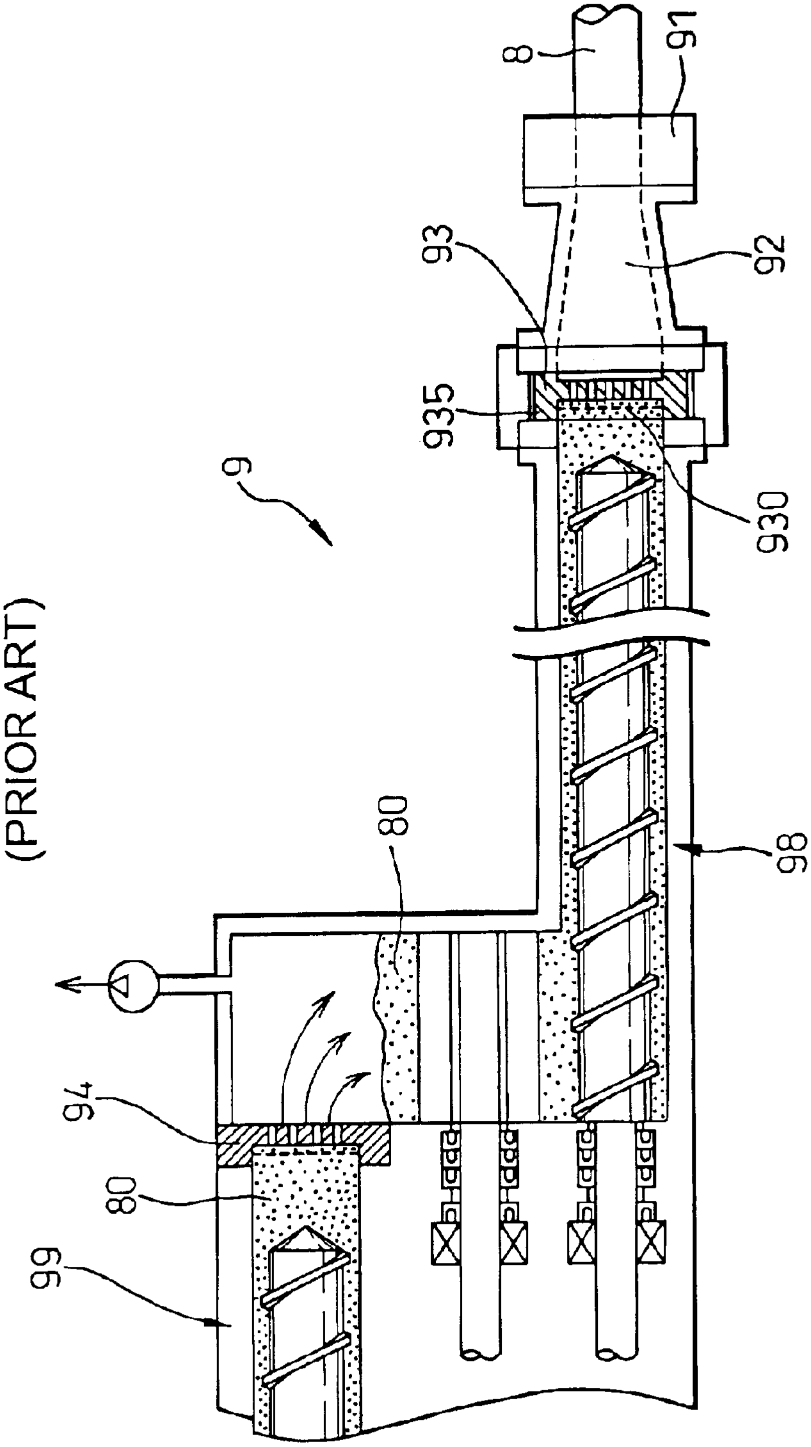
Fig.8 (PRIOR ART)
FIG. 8 is a diagram for explaining the configuration of a conventional extrusion molding apparatus.
Figure 9:
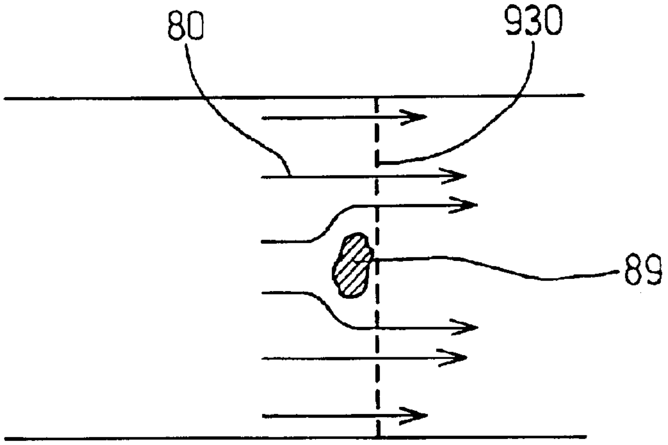
Fig. 9 (PRIOR ART)
FIG. 9 is a diagram for explaining the problems posed by the prior art.

In the extrusion molding apparatus 1 according to this embodiment, at least one other screw extruder may be arranged in a stage higher than the screw extruder 4 (FIG. 8). In such a case, a filter unit is arranged also at the extrusion outlet of the screw extruder in the upper stage with a spatula portion formed at the inlet thereof in the same manner as described above (not shown). In this way, the material lump is prevented from being deposited at the extrusion outlet of the upper-stage screw extruder, thereby making it possible to further improve the fluidity of the ceramic material.

Further, according to this embodiment, the employment of the aforementioned configuration can remarkably lengthen the service life of the apparatus before the filter net 30 is clogged. Specifically, in the case where the apparatus is run continuously, the filter net of the conventional apparatus is clogged within about a half day to deteriorate the fluidity of the ceramic material. According to this embodiment, in contrast, a high fluidity can be secured for at least two days.

Embodiment 2

Figure 5:
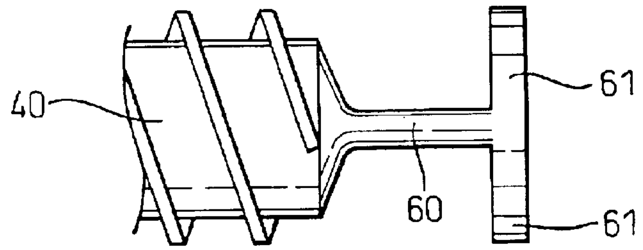
FIG. 5 is a diagram for explaining the structure of the spatula portion according to a second embodiment of the invention.

According to this embodiment, as shown in FIG. 5, the spatula portion 5 in the first embodiment is replaced by two blade portions 61 like a propeller arranged on the forward end axial portion 60 extended from the forward end of the screw 40. Also in this case, the functions and effects similar to those of the first embodiment can be obtained.

Embodiment 3

Figure 6:
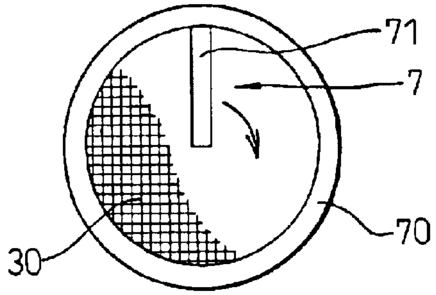
FIG. 6 is a diagram for explaining the structure of the spatula portion according to a third embodiment of the invention.

According to this embodiment, as shown in FIG. 6, the spatula portion 5 of the first embodiment is removed to restore the shape of the conventional screw, and a spatula portion 7 including a ring portion 70 adapted to rotate by external drive means and a blade portion 71 extended inward of the ring portion 70 is formed on the inlet surface 30 of the filter unit 3. In this case, the manner in which the spatula is moved can be changed freely regardless of the screw. The functions and effects similar to those of the first embodiment are obtained for the other points.

Each of the embodiments described above is assumed to have a mold of honeycomb structure for producing a honeycomb structure. Nevertheless, similar functions and effects can be secured even in the case where the object to be molded is a different molded product such as a sheet, a round bar, a pipe or the like.

What is claimed is:

1. An extrusion molding apparatus for a ceramic molded product, comprising a mold for molding a ceramic molded product, a screw extruder for supplying a ceramic material to the mold, and a filter unit for filtering the ceramic material at an extrusion outlet of said screw extruder, wherein said screw extruder has built therein a screw for kneading while moving the ceramic material forward, and has on a front part thereof a spatula portion adapted to move over an inlet surface of the filter unit with a predetermined interval between the spatula portion and the inlet surface, and wherein the interval between said spatula portion and said inlet surface is in the range of 0.1 to 30 mm.

2. An extrusion molding apparatus for a ceramic molded product according to claim 1, wherein said spatula portion is so configured as to move while rotating over the inlet surface of the filter unit.

3. An extrusion molding apparatus for a ceramic molded product according to claim 2, wherein said spatula portion is extended from a forward end of the screw and configured to rotate while moving with the screw.

4. An extrusion molding apparatus for a ceramic molded product according to claim 3, wherein said screw includes a lead portion arranged spirally around an axial member, the lead portion having a forward end thereof forming the spatula portion.

5. An extrusion molding apparatus for a ceramic molded product according to claim 3, wherein said spatula portion is configured of a plurality of blades arranged on a foremost axial portion extended from the forward end of the screw.

6. An extrusion molding apparatus for a ceramic molded product according to any one of claims 2 to 5, wherein said spatula portion has a tapered surface inclined in such a manner as to move away from the inlet surface progressively with respect to the direction of movement.

7. An extrusion molding apparatus for a ceramic molded product according to claim 1, wherein said spatula portion has a tapered surface inclined in such a manner as to move away from the inlet surface progressively with respect to the direction of movement.

* * * * *